UNITED STATES PATENT OFFICE.

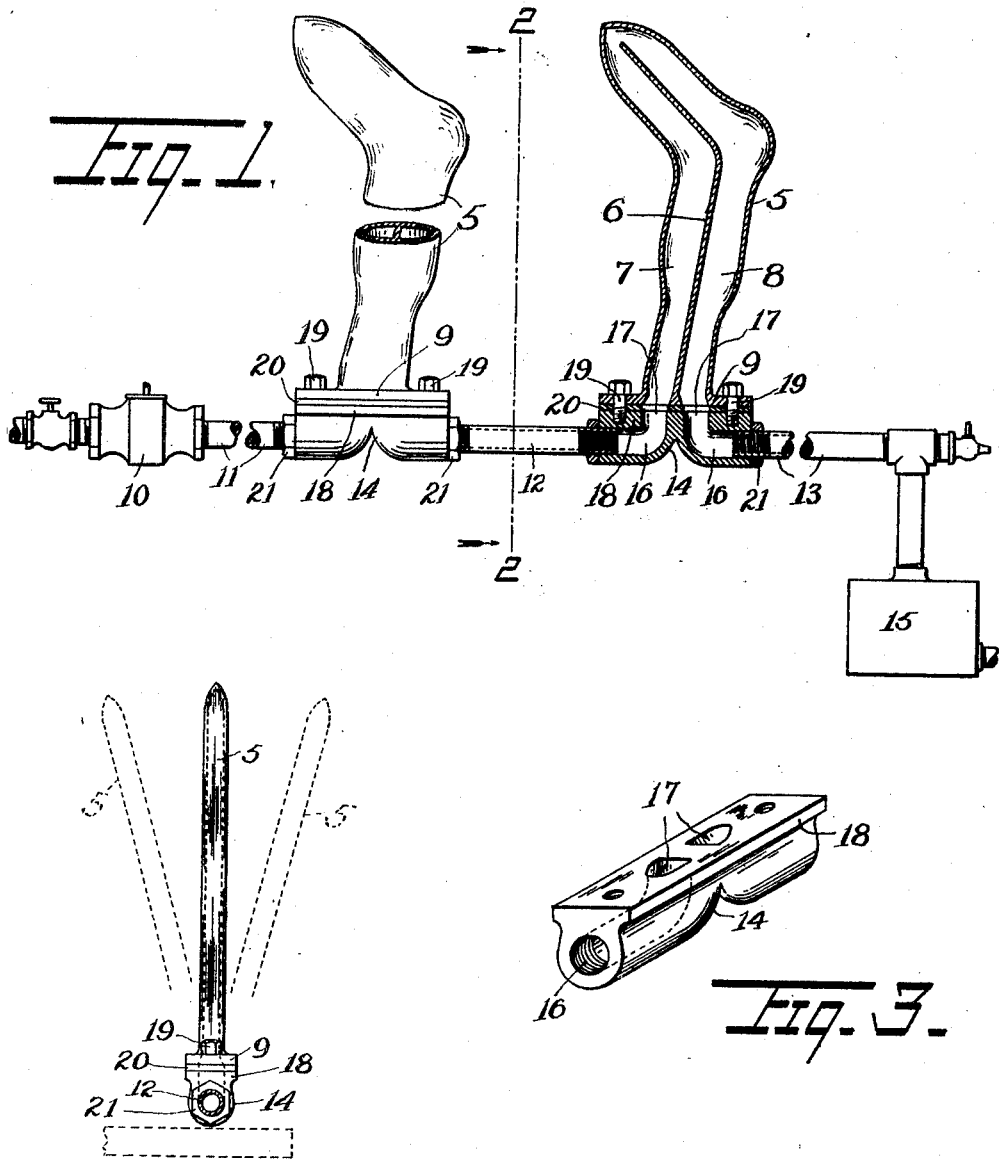

WILLIAM H. ERMENTROUT, OF READING, PENNSYLVANIA.

DRYING MECHANISM FOR HOSIERY.

1,037,224.  Specification of Letters Patent.  Patented Sept. 3, 1912.

Application filed April 22, 1912. Serial No. 692,494.

*To all whom it may concern:*

Be it known that I, WILLIAM H. ERMENTROUT, a citizen of the United States, and a resident of the city of Reading, in the county of Berks and State of Pennsylvania, have invented certain new and useful Improvements in Drying Mechanism for Hosiery, of which the following is a specification.

My invention relates to improved means for drying stockings, or like textile fabrics, upon interiorly heated hollow forms, and it provides for a simple and advantageous mounting of the forms upon connected sections of piping by which the heating medium is conveyed to and positively circulated through the forms.

The invention is fully described in connection with the accompanying drawings and is specifically pointed out in the claim.

Figure 1 is an elevation indicating a series of forms mounted upon a series of connected steam-pipe sections; one of the forms and its connecting fitting being shown in vertical section. Fig. 2 is a cross-sectional view on the line 2—2 of Fig. 1, indicating in dotted lines the adjustability of each form to any desired working angle. Fig. 3 is a separate view of one of the connecting fittings.

Each of the hollow hosiery forms 5 indicated, is preferably made of cast metal, oval in cross-section, and with a longitudinally extending partition 6 dividing the inclosed space into an upward passage 7 and a downward passage 8, both of which communicate with a special fitting 14 to which the base 9 of the form is secured, as hereinafter fully described.

The heating medium most conveniently employed ordinarily, is steam, which is furnished through a suitable pressure-reducing valve at 10 as indicated, to a horizontally arranged conduit made up of alined steam-pipe sections 11, 12, 13, and of connecting fittings 14 therefor carrying a corresponding number of the forms 6; the end of the section 13 terminating in any ordinary steam trap at 15.

Each of the special fittings 14 has similar passage ways 16, 16 extending inward from its opposite ends, and terminating in right-angled exit ways 17, 17 through the wall 18 of the fitting; to which latter the form 14 is secured, by means of screw bolts 19 engaging the base 9 of the form. The ends of the passage ways 16, 16 are interiorly screw-threaded to receive the connecting screw-threaded ends of the adjacent pipe sections, 11 and 12, or 12 and 13 as shown; and the exit ways 17, 17 are spaced apart on the fitting so as to communicate respectively with the upward passage 7 and downward passage 8 of the form. A steam-tight joint is formed between each form and its attached fitting, by means of a suitable gasket 20. Each form 5 may be turned, jointly with its fitting 14, upon the connecting ends of the adjacent pipe sections, so as to adjust the form to the most convenient angle (see Fig. 2), for enabling the operator to "board" the stockings thereon and to remove the same after drying; the properly adjusted form being readily locked if required by means of a jam nut or nuts 21 on the pipe sections. The piping and its attached forms are most conveniently arranged above an operator's table, but the forms are directly carried by and adjustable upon the piping itself, thus providing a very simple and advantageous arrangement.

What I claim is:—

A drying mechanism for hosiery and like tubular fabrics, comprising horizontally alined steam-pipe sections; connecting fittings for said sections, each provided with opposite-end horizontal passage-ways having screw-threaded engagement with adjacent alined sections and spaced-apart vertical exits through the upper wall of the fitting; and hollow vertically-partitioned formers each removably secured to one of said fittings and forming a communicating passage-way between said spaced-apart exits; each former and fitting being jointly adjustable upon the connected pipe sections substantially as set forth.

In testimony whereof, I affix my signature, in the presence of two witnesses.

WILLIAM H. ERMENTROUT.

Witnesses:
D. M. STEWART,
W. G. STEWART.